US007995967B2

(12) United States Patent
Li et al.

(10) Patent No.: US 7,995,967 B2
(45) Date of Patent: Aug. 9, 2011

(54) METHODS AND APPARATUS FOR RANDOM ACCESS IN MULTI-CARRIER COMMUNICATION SYSTEMS

(75) Inventors: Xiaodong Li, Kirkland, WA (US); Titus Lo, Bellevue, WA (US); Kemin Li, Bellevue, WA (US); Haiming Huang, Bellevue, WA (US)

(73) Assignee: Neocific, Inc, Bellevue, WA (US)

( * ) Notice: Subject to any disclaimer, the term of this patent is extended or adjusted under 35 U.S.C. 154(b) by 697 days.

(21) Appl. No.: 10/583,158

(22) PCT Filed: Mar. 9, 2005

(86) PCT No.: PCT/US2005/008169
§ 371 (c)(1),
(2), (4) Date: Aug. 27, 2008

(87) PCT Pub. No.: WO2005/088853
PCT Pub. Date: Sep. 22, 2005

(65) Prior Publication Data
US 2008/0305822 A1    Dec. 11, 2008

Related U.S. Application Data

(60) Provisional application No. 60/551,589, filed on Mar. 9, 2004.

(51) Int. Cl.
*H04B 15/00* (2006.01)
(52) U.S. Cl. .................. 455/63.1; 455/522; 370/329
(58) Field of Classification Search ............ 455/63.1
See application file for complete search history.

(56) References Cited

U.S. PATENT DOCUMENTS

| 4,977,593 A | 12/1990 | Ballance et al. |
| 5,991,308 A | 11/1999 | Fuhrmann et al. |
| 6,519,449 B1 | 2/2003 | Zhang et al. |
| 2010/0111017 A1* | 5/2010 | Um et al. ............ 370/329 |

OTHER PUBLICATIONS

International Search Report and Written Opinion; International Patent Application No. PCT/US05/08169; Filed Mar. 9, 2005; Applicant: Waltical Solutions, Inc.; Mailed Jun. 9, 2005; 9 pages.

* cited by examiner

Primary Examiner — Duc Nguyen
Assistant Examiner — Ajibola Akinyemi
(74) Attorney, Agent, or Firm — Perkins Coie LLP

(57) ABSTRACT

Methods and apparatus in a multi-carrier cellular wireless network (303, 304, 305, 320) with random access improve receiving reliability and reduce interference of uplink signals of a random access, while improving the detection performance of a base station receiver (310, 320) by employing specifically configured ranging signals.

20 Claims, 8 Drawing Sheets

METHODS AND APPARATUS FOR RANDOM ACCESS IN MULTI-CARRIER COMMUNICATION SYSTEMS

CROSS-REFERENCE TO RELATED APPLICATION(S)

This application claims the benefit of U.S. Provisional Patent Application No. 60/551,589, filed on Mar. 9, 2004.

BACKGROUND

In a wireless communication system, a mobile station first needs to perform a random access for establishing communication with a base station. The random access typically includes two steps: (1) Ranging and (2) Resource Request and Allocation. During Ranging, the mobile station sends a signal to the base station, so that the base station can identify the mobile station and measure the power and time delay of the mobile station, and inform the mobile station for power adjustment and time advance. During Resource Request and Allocation, the uplink and downlink resources for communication are requested and allocated. Ranging is a critical part of multi-carrier wireless communication system, and there are several important issues related to ranging:
1. The bandwidth efficiency of the ranging signals
2. The interference of ranging signal with other uplink signals
3. The detection performance and complexity at the base station receiver The ranging process typically involves an exchange of messages between the base station and the mobile station by which the mobile station aligns itself with the start of each time slot after compensating for propagation delay and other factors. One problem in a shared medium communication network involves the ranging of many mobile stations. When many mobile stations attempt to perform the ranging simultaneously, they are forced to contend for access to the shared channel and it becomes difficult for any of the mobile stations to complete the ranging process due to the large number of collisions. As a result, the time needed for all of the mobile stations to complete the ranging process is excessive, and much bandwidth on the shared channel is wasted.

DETAILED DESCRIPTION

In the following description, the invention is explained with respect to some of its various embodiments, and provides specific details for a thorough understanding. However, one skilled in the art will understand that the invention may be practiced without such details. In other instances, well-known structures and functions have not been shown or described in detail to avoid obscuring aspects of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The embodiments of this invention disclose methods and apparatus for random access in a multi-carrier system. In particular, ranging signals are designed to improve receiving reliability and to reduce interference with other uplink signals. Furthermore, methods and apparatus are described that improve the detection performance at the base station receiver.

In a multi-carrier communication system such as multi-carrier code division multiple access (MC-CDMA) and orthogonal frequency division multiple access (OFDMA) systems, information data are multiplexed on subcarriers that are mutually orthogonal in the frequency domain. In effect, a frequency selective channel is partitioned in frequency into a number of parallel, but small, segments that can be treated as flat fading channels and can employ simple one-tap equalizers. The modulation/demodulation can be performed using the fast Fourier transform (FFT).

In a multi-carrier communication system the physical media resource (e.g., radio or cable) can be divided in both the frequency and time domains. This canonical division provides a high flexibility and fine granularity for resource sharing. A basic structure of a multi-carrier signal in the frequency domain is made up of subcarriers, and within a particular spectral band or channel there are a fixed number of subcarriers. There are three types of subcarriers:
1. Data subcarriers, which carry information data;
2. Pilot subcarriers, whose phases and amplitudes are predetermined and made known to all receivers and which are used for assisting system functions such as estimation of system parameters; and
3. Silent subcarriers, which have no energy and are used for guard-bands and DC carriers.

Figure 1:
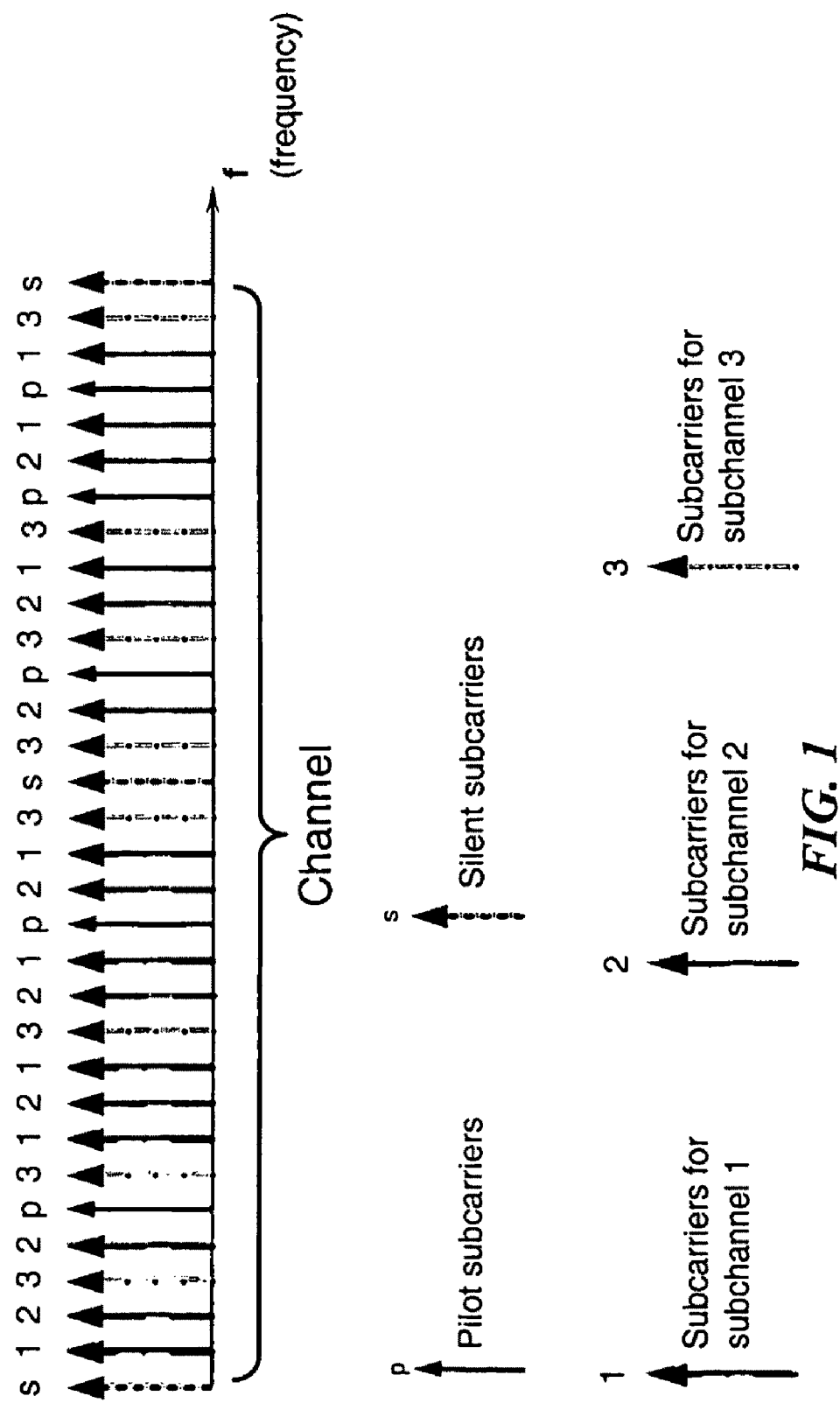
FIG. 1 depicts a basic structure of a multi-carrier signal in the frequency domain, made up of subcarriers.
Figure 2:
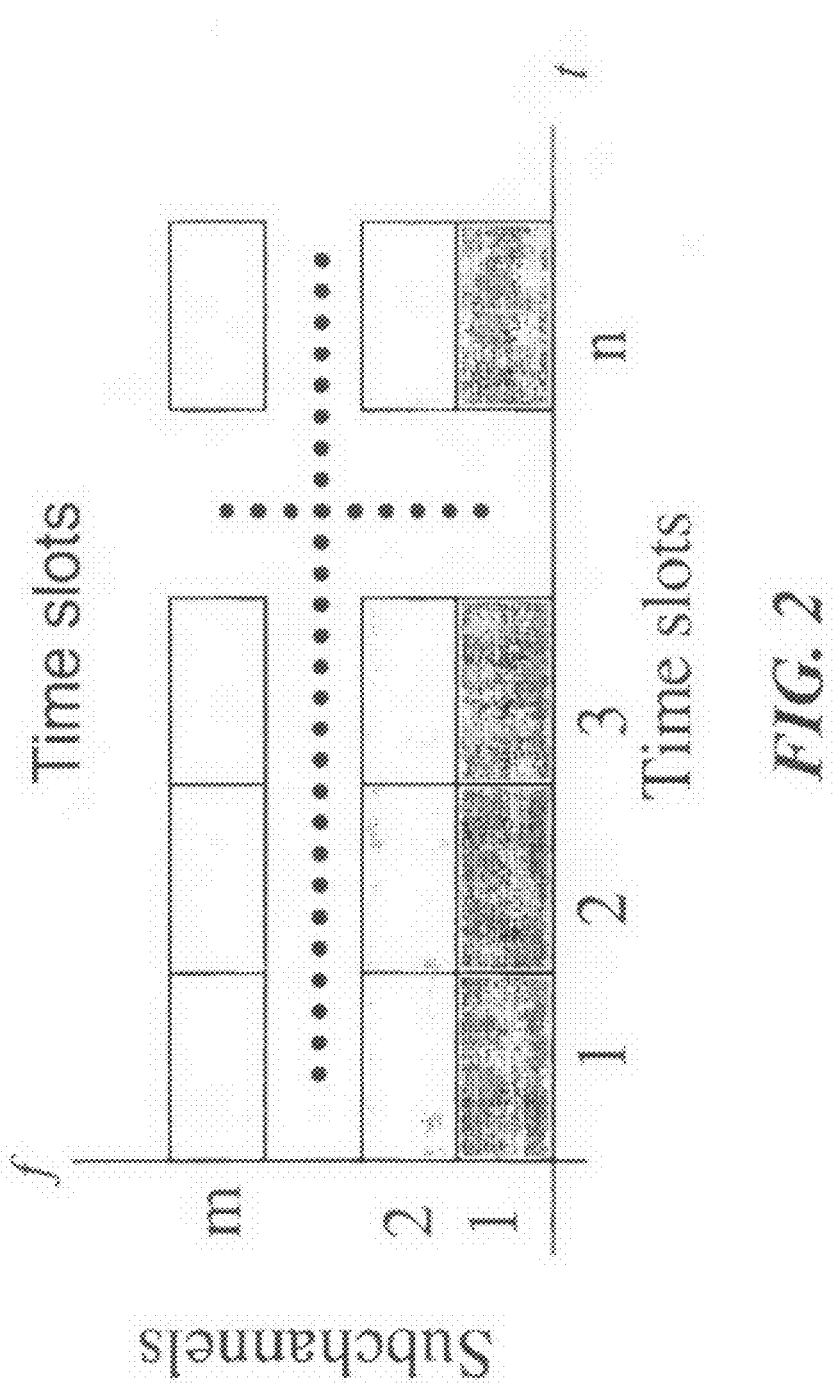
FIG. 2 shows a radio resource divided into small units in both the frequency domain (subchannels) and the time domain (time slots).

The data subcarriers can be arranged into groups called subchannels to support scalability and multiple-access. The carriers forming one subchannel are not necessarily adjacent to each other. Each user may use part or all of the subchannels. The concept is illustrated in FIG. 1 for the interleaved subchannels at the base station transmitter. Data subcarriers can be grouped into subchannels in a particular way and the pilot subcarriers are also distributed over the entire channel in a particular way. The basic structure of a multi-carrier signal in the time domain is made up of time slots to support multiple-access. The resource division in both the frequency and time domains is depicted in FIG. 2.

Figure 3:
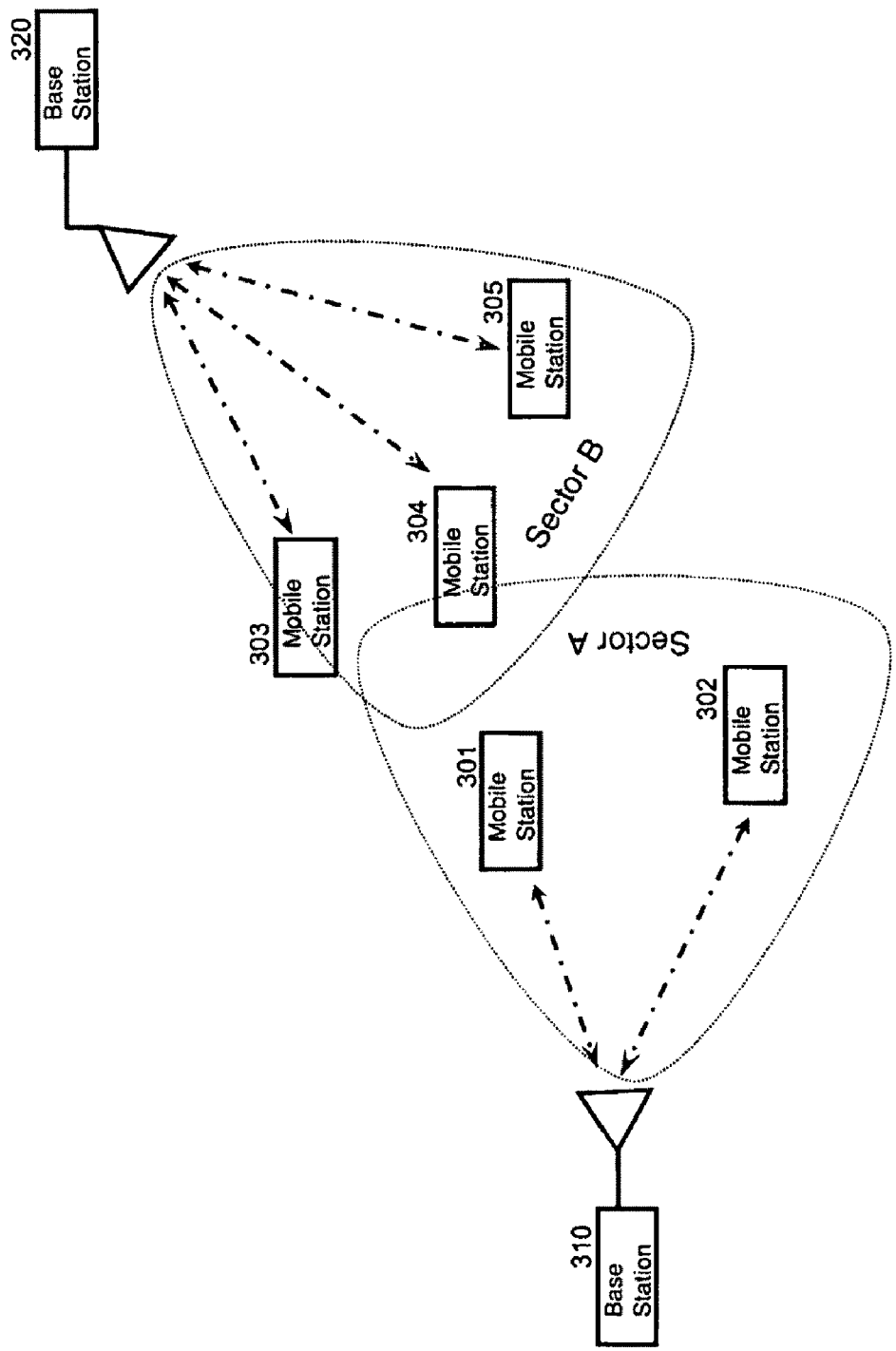
FIG. 3 shows a cellular system with at least one cell and one base station.

FIG. 3 illustrates a typical cellular structure. In this illustration no distinction is made between a cell and a sector. If a cell is divided into sectors, from a system engineering point of view each sector can be considered a cell. In this context, the terms "cell" and "sector" are interchangeable. Both of them are generally called a cell. In the communication system of FIG. 3 Base Station 310 is communicating with Mobile Stations 301 and 302 in Sector A of its cell site while Base Station 320 is communicating with Mobile Stations 303, 304, and 305 in Sector B of its cell site.

Figure 4:
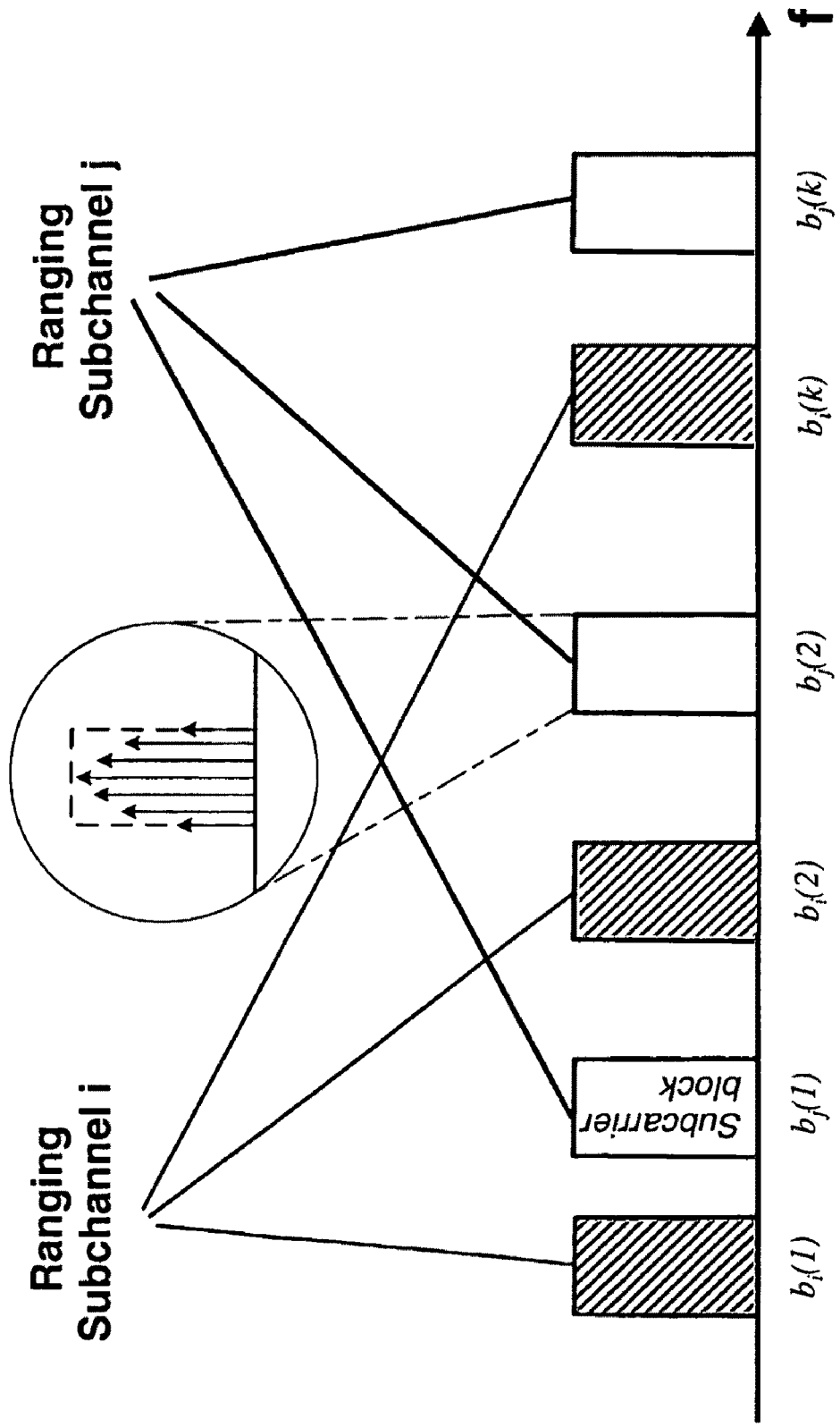
FIG. 4 depicts a ranging subchannel composed of at least one block of subcarriers.

FIG. 4 illustrates two ranging subchannels, each of which is composed of multiple blocks of subcarriers. The subcarriers in each block are contiguous in frequency. FIG. 4 schematically shows that the signal power of the subcarriers towards the boundary (the lower ends and the higher ends in frequency) of a block is lower than that of the subcarriers towards the center of the block. (In a special case, the power levels of the two subcarriers at both ends of a block are set to zero.) Because different factors may cause possible overlap of two subcarrier blocks from to different transmitters, the attenuated boundary subcarriers will minimize the resulting interference.

In accordance with aspects of some embodiments, the ranging signal is carried over a ranging subchannel that contains multiple subcarriers. Either binary or non-binary signals can be modulated on the subcarriers of a ranging subchannel.

The sequence of modulating signals in a ranging subchannel is called a ranging sequence. Multiple ranging sequences are permitted in a cell. A mobile station chooses a ranging sequence for random access and uses the sequence to identify itself in the initial communication with a base station. The period of a ranging signal is called a ranging slot. A ranging slot may last over one or multiple OFDM symbols. Multiple ranging slots can be provided to increase the random access opportunity and reduce the collision probability.

In one embodiment, different cells may have different subcarrier configurations for their ranging subchannels. Different cells may also have different ranging sequence sets. These differences may be used to identify the association of a mobile station with a cell.

Figure 5:
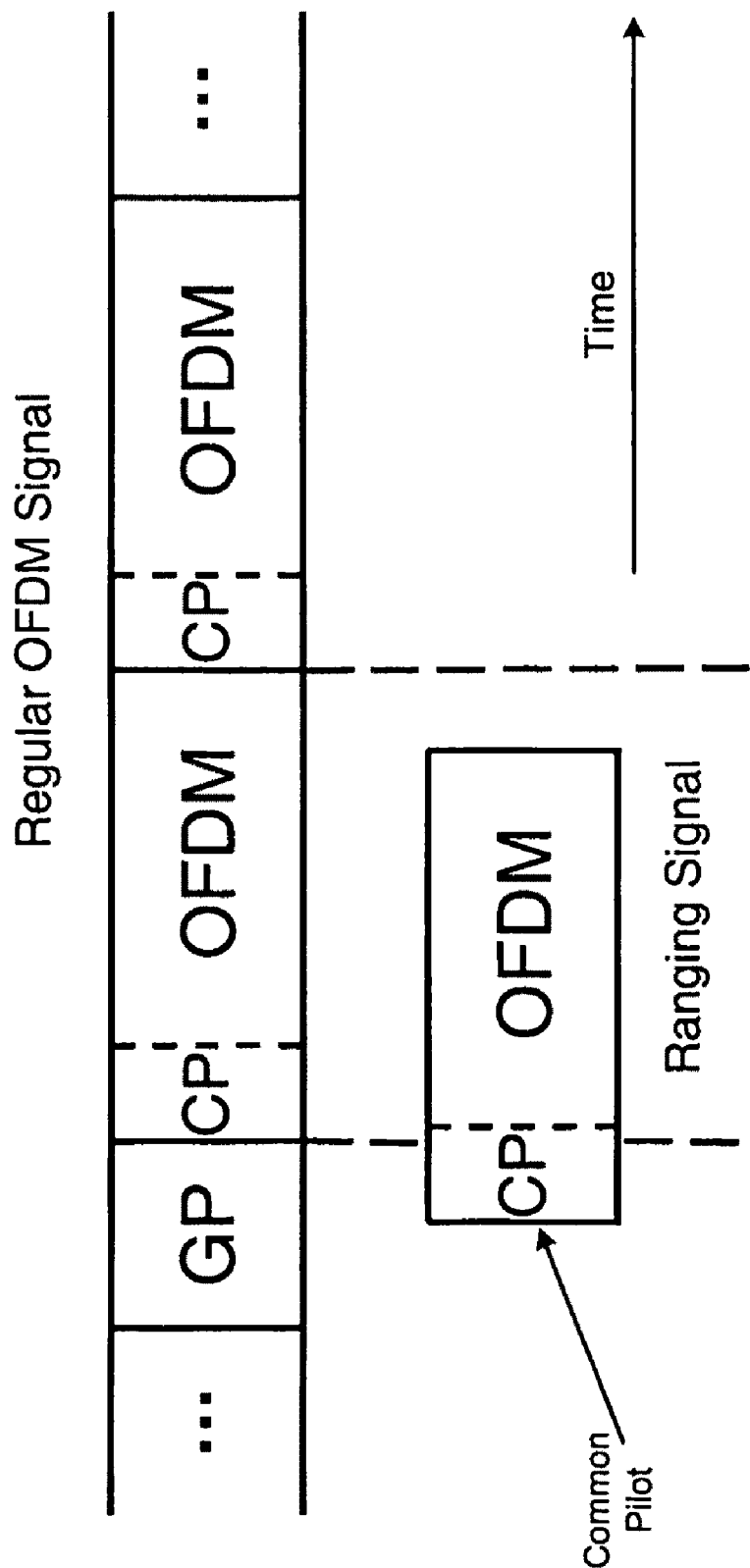
FIG. 5 illustrates a case of time misalignment in a ranging signal, with a base station OFDM time frame, due to uncertainty of a mobile station's round trip delay at an initial stage of random access.
Figure 6:
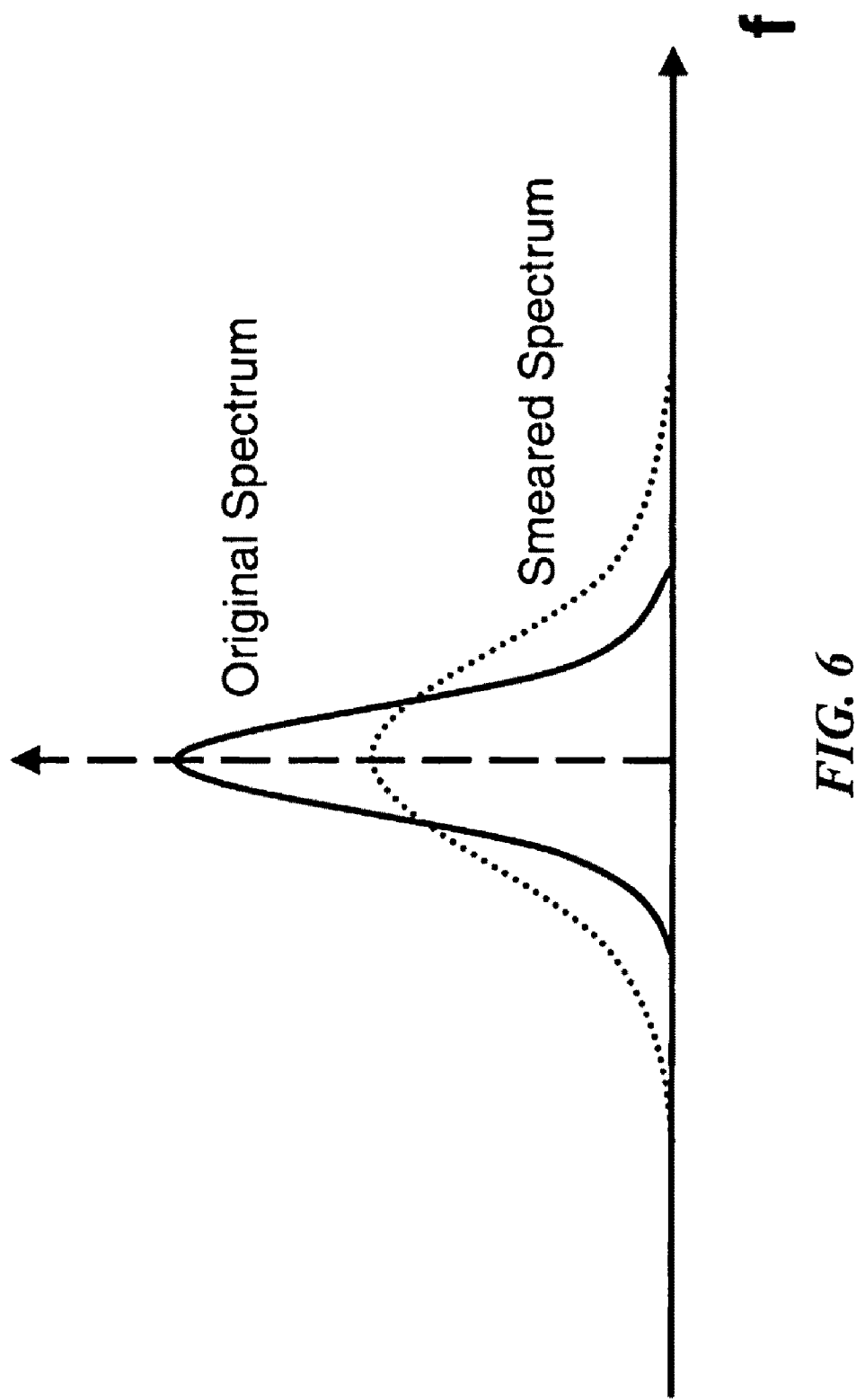
FIG. 6 depicts a smeared spectrum of a subcarrier in a ranging subchannel when the ranging signal is received using a regular OFDM time frame.

FIG. 5 illustrates the timing of regular uplink data signals and ranging signals (with a Guard Period G.P.). In the beginning of a random access attempt, the mobile station is unaware of its round-trip time to the base station. As a result, the arrival time of ranging signal at the base station may be misaligned with other signals which have been synchronized to the base station clock. As depicted in FIG. 5, the random access Ranging Signal does not coincide with the expected arrival time at the base station. As shown in FIG. 6, time misalignment of regular signals and ranging signals can cause spectrum of ranging signals to be smeared when it is received using the OFDM time window of regular signals. Therefore, misaligned subcarriers within a ranging subchannel will interfere with each other and with other data subchannels that are adjacent to them. In the following description, several methods are presented to address such problems.

In one embodiment, the ranging subchannel is composed of multiple blocks of subcarriers. The subcarriers in each block are contiguous in frequency. The signal power of the subcarriers towards the boundary (the lower ends and the higher ends in frequency) of a block is lower than that of the subcarriers towards the center of the block. In a special case, the power levels of the two subcarriers at both ends of a block are set to zero.

In yet another embodiment, each segment of a ranging sequence is a Hadamard sequence and a full ranging sequence is composed of multiple Hadamard sequences. Each segment corresponds to a block of contiguous subcarriers. In Table 1, a typical example is shown for two ranging sequences. Each segment is a 4-bit Hadamard sequence and each ranging sequence is composed of 4 segments. The two ranging sequences are segment-wise orthogonal to each other.

TABLE 1

| Example of ranging sequences | | | | |
|---|---|---|---|---|
| Ranging Sequence 1 | +1 −1 +1 −1 | +1 +1 +1 +1 | +1 +1 −1 −1 | +1 −1 −1 +1 |
| Ranging Sequence 2 | +1 +1 +1 +1 | +1 −1 −1 +1 | +1 −1 +1 −1 | +1 +1 −1 −1 |

Figure 7:
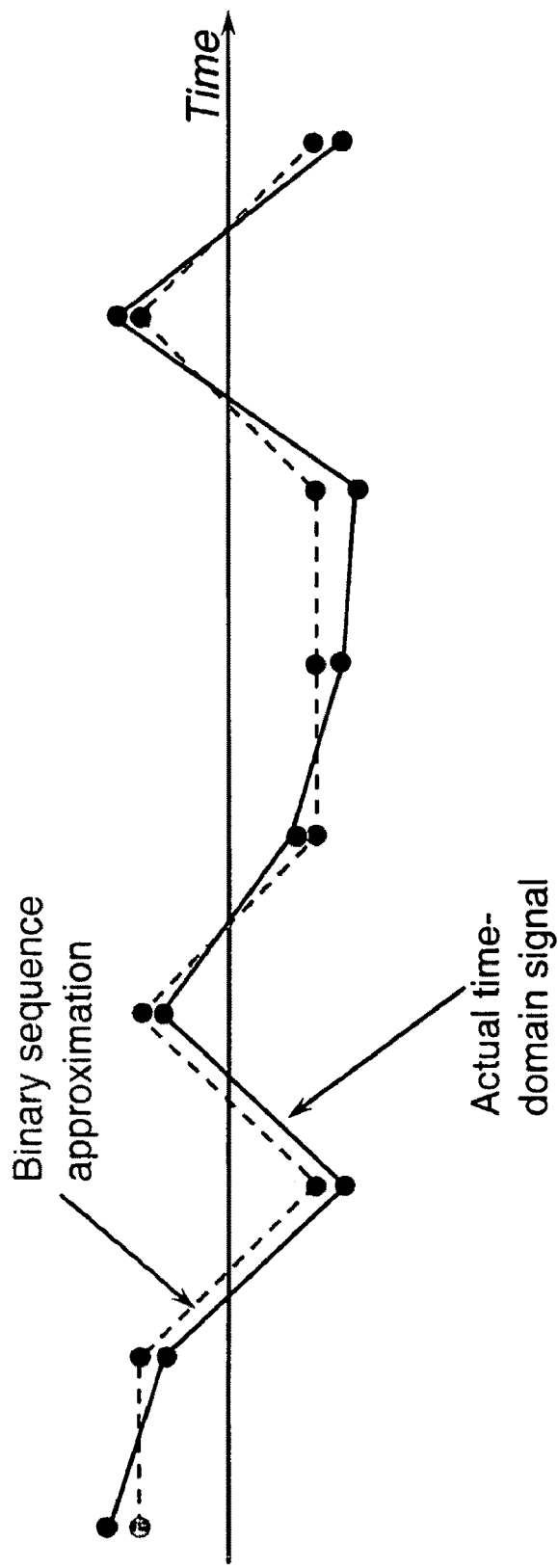
FIG. 7 illustrates a ranging sequence's corresponding time-domain signal that can be approximated with a binary sequence.

In addition, other properties in signal processing can be exploited in sequence design. In one embodiment of the implementation, the ranging sequence is designed such that its corresponding time-domain signal exhibits relatively low peak-to-average power ratio. This improves the power efficiency of the mobile station transmission power amplifier. Furthermore, the ranging signal is designed such that the time signal can be approximated with a binary sequence (e.g., FIG. 7), thereby reducing the complexity of the receiver correlator. While in theory, and even in practice, each modulating digit of a ranging sequence can represent a range of logic levels, a binary format is practically the simplest representation and requires the simplest receiver components for its processing. FIG. 7 illustrates a ranging sequence's corresponding time-domain signal that can be approximated with a binary sequence.

In another embodiment, the blocks of a ranging subchannel can be distributed or allocated in such a way that the autocorrelation of a ranging sequence corresponding to the ranging subchannel, in time-domain, exhibits a set of desired properties such as a narrow main peak and low sidelobes. For example, the blocks can be distributed in the frequency band of interest such that there is minimum redundancy in a co-sampling function. In other words, spacing between the blocks of a ranging subchannel in the frequency domain has no or minimum repetition, as illustrated in FIG. 8, where the spacing consists of the set {d, 2d, 3d, 4d, 5d, 6d}.

Figure 8:
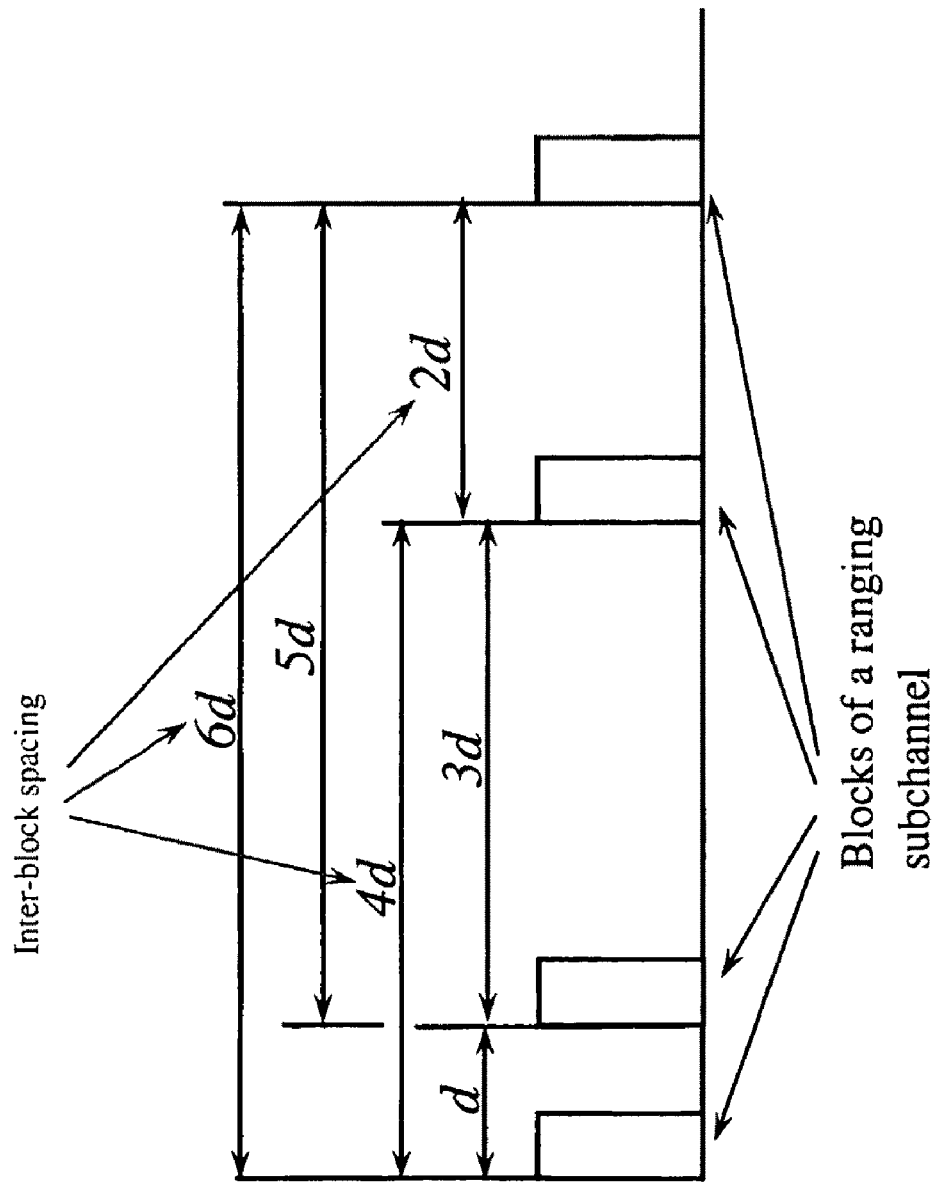
FIG. 8 shows a ranging subchannel arrangement in which spacing between subcarrier blocks in the frequency domain has no, or minimum, repetition.

FIG. 8 is merely an example of such possible arrangements, where an autocorrelation process only produces one major peak, regardless of the ranging sequence carried by the ranging subchannel blocks. During an autocorrelation process, two copies of a ranging signal move in parallel with respect to each other, in a step-wise manner, and at each step the sum of the multiplication of their corresponding values is computed and recorded. Note that in an interval of a ranging subchannel where there are no subcarriers, the ranging signal value is zero. Therefore, employing the proposed arrangements, at any step except for the step during which the two copies of the ranging signal are substantially aligned, most of the non-zero values of either copy will correspond to the zero values of the other copy and the multiplication result of the corresponding values will be zero, which results in low sidelobe values.

With regard to controlling the power settings of a ranging signal, before a random access, a mobile station estimates the path loss from a base station, using the received downlink signal. It uses open-loop power control to set the power level of the ranging signal. In one embodiment, the mobile station adds a negative offset to the open-loop power setting and gradually ramps up the transmission power of the ranging signal as the number of random access failures and retrials increase.

In one embodiment, the base station receiver detects the presence of each ranging signal, its time delay, and its power level through the use of a matched filter, a correlator, or other means in the time domain, the frequency domain, or both.

In another embodiment, when the ranging subchannel is composed of blocks of contiguous subcarriers, the base station performs hierarchical detection: first in frequency domain, then in time domain. The detection process is as follows:

1. The FFT is applied to a selected window of the received time-domain signal, s(t).
2. For a particular ranging subchannel, its received version, $\{\vec{r}(k)\}_{k=1}^{K}$, is correlated in the frequency domain with the ranging sequences associated with the cell, in a segment-wise fashion, where K is the total number of blocks in a ranging subchannel. If the $m^{th}$ sequence associated with the cell is denoted by $\{\vec{b}_m(k)\}_{k=1}^{K}$, the correlation value, $P_m$, is computed by:

$$P_m = \sum_{k=1}^{K} |\langle \vec{r}(k) \cdot \vec{b}_m(k) \rangle|^2,$$

where the dot-product is computed by:

$$\langle \vec{r}(k) \cdot \vec{b}_m(k) \rangle = \sum_{n=1}^{N} x(k,n) \cdot [c_m(k,n)]^*$$

and where N denotes the number of subcarriers in a block, x(k,n) denotes the received version of the $n^{th}$ subcarrier of the $k^{th}$ block in the given ranging subchannel, and $c_m$(k, n) represents the value of the $n^{th}$ subcarrier of the $k^{th}$ block in the given ranging subchannel for the $m^{th}$ sequence. It is noted that both $\vec{r}(k)$ and $\vec{b}_m(k)$ are vectors of the dimension same as the segment length. If $P_m$ is greater than a given threshold, this indicates that a ranging signal corresponding to the $m^{th}$ sequence has been detected.

3. For the ranging signal identified in Step 2, a time-domain correlation of the full sequence of the ranging signal is performed, in a sliding-window fashion, to find the time delay of that ranging signal, that is:

$$C(\tau) = \left| \sum_{t=0}^{T} s(t+\tau) \cdot z^*(t) \right| \text{ for } \tau = 0, 1, \ldots, D$$

where T denotes the length of the time-domain ranging sequence, D corresponds to the maximum time delay allowed by the system, and z*(t) represents the time-domain signal of the detected ranging sequence. The maximum value of C(τ) for τ=0, 1, ..., D is the estimate of the power of the ranging signal and the corresponding value of τ indicates the time delay associated with the ranging signal.

In the case of ranging sequences composed of Hadamard sequences, the dot-products of the received signal and the ranging sequence in a particular segment in Step 2 can be evaluated simultaneously using a single Fast Hadamard Transform (FHT), thereby simultaneously detecting multiple ranging sequences.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

We claim:

1. In a wireless communication system, a method of establishing communication between a mobile and a base station using a ranging signal, the method comprising:
    modulating, in the mobile station, ranging signals on at least one ranging subchannel:
        wherein the ranging subchannel includes multiple subcarrier blocks;
        wherein subcarriers in each subcarrier block are contiguous in frequency;
        wherein ranging subchannels associated with the base station employ predetermined block configurations; and
        a sequence of all modulating signals in a ranging subchannel is a ranging sequence;
    estimating by the mobile station, using a received downlink signal from the base station, a path loss between the base station and the mobile station;

setting a power level of the ranging signals by an open-loop power control, wherein the mobile station adds a negative offset to the open-loop power setting to begin sending the ranging signal and gradually increases power as a number of failures and retries increases;

detecting, by the base station, a presence of the ranging signal, a time delay, and the power level, wherein the detection process comprises:

applying Fast Fourier Transform (FFT) to a selected window of the ranging signal;

correlating, in the frequency-domain, stored ranging sequences with the ranging signal, wherein the correlation is performed segment-wise, and wherein each segment of the correlation is performed on the subcarrier block using a correlation result to detect and identify the ranging signal; and correlating, in the time-domain, the identified ranging signal with a corresponding one of the stored ranging sequences, in a sliding-window fashion, to determine the time delay and power level of the ranging signal.

2. The method of claim 1, wherein a total energy of a correlation of all segments identify a presence of the ranging signal.

3. The method of claim 1, wherein detection is performed using a matched filter, correlator, or both, and wherein the base station performs a hierarchical detection, first in frequency-domain and then in time-domain.

4. The method of claim 1, wherein if the ranging sequences are Hadamard sequences, dot-products of the ranging signal and a ranging sequence in a particular segment are simultaneously evaluated using a Fast Hadamard Transform (FHT).

5. In a wireless communication system of cells, base stations, and mobile stations, a method of transmitting ranging signals by a mobile station to a base station for initiating a random access and establishing communication between the mobile station and the base station, wherein the base station uses the ranging signals to identify the mobile station, determine the mobile station's signal power, and measure the mobile station's time delay, the method comprising: constructing ranging subchannels:

wherein a ranging subchannel includes at least one block having a plurality of subcarriers;

wherein the subcarriers in a block are contiguous in frequency;

wherein power of a block is shaped by assigning different signal power levels to different subcarriers of the block;

wherein a signal power towards both frequency boundaries of a subcarrier block is lower than a signal power of subcarriers towards the center of the block; and assigning specific block configurations to ranging subchannels for each cell; and transmitting binary or non-binary ranging signals over the ranging subchannels by modulating the plurality of subcarriers, wherein a sequence of modulating signals in a ranging subchannel is a ranging sequence, and wherein each ranging signal has low peak-to-average power ratio in the time domain.

6. The method of claim 5, wherein a sequence of all modulating signals in a ranging subchannel is a ranging sequence, and wherein the blocks of a ranging subchannel are allocated so that the subchannel's autocorrelation in time-domain exhibits a set of specified properties.

7. The method of claim 6, wherein a cell uses a specific subcarrier configuration for its ranging subchannels, and uses a specific set of ranging sequences.

8. The method of claim 6, wherein the ranging subchannel blocks are distributed to provide minimum redundancy in a co-sampling function, or that spacing between the blocks of a ranging subchannel in the frequency-domain has no or minimum repetition.

9. The method of claim 5, wherein a sequence of all modulating signals in a ranging subchannel is a ranging sequence, each segment of a ranging sequence is a Hadamard sequence, a full ranging sequence is composed of multiple Hadamard sequences, and wherein each segment corresponds to a block of contiguous subcarriers.

10. The method of claim 5, wherein the sequence of modulating signals is approximated by a binary sequence for reducing complexity of a receiver correlator.

11. In a network of base stations and remote stations, a remote station transmitter configured to transmit ranging signals for initiating communication with the base station, wherein the base station uses ranging signals to identify the remote station and determine at least one transmitter attribute, the transmitter comprising:

a facility for constructing ranging subchannels:

wherein a ranging subchannel comprises a plurality of subcarrier blocks;

wherein the subcarriers of a block are contiguous in frequency;

wherein different power levels are assigned to different subcarriers of the block; and wherein a power level towards the high-end and low-end frequency boundaries of a subcarrier block is lower than a signal power of subcarriers towards the center of the block, or wherein a power level of the two subcarriers at both ends of a subcarrier block is zero;

a modulator for modulating binary or non-binary ranging signals on the subcarriers of the ranging subchannels, wherein a sequence of modulating signals in a ranging subchannel is a ranging sequence; and wherein each ranging signal has low peak-to-average power ratio in the time domain.

12. The transmitter of claim 11, wherein the base station uses a specific subcarrier configuration and employs a specific set of ranging signals to identify an association with the remote station.

13. The transmitter of claim 11, wherein the subchannel blocks of the ranging subchannel are assigned for autocorrelation in time-domain.

14. The transmitter of claim 11, wherein the subchannel blocks are distributed for minimum redundancy.

15. The transmitter of claim 11, wherein a sequence of all modulating signals in a ranging subchannel is a ranging sequence, and each segment of the ranging sequence is a Hadamard sequence.

16. The transmitter of claim 11, wherein a time-domain signal corresponding to the ranging sequence is associated with a binary sequence.

17. A communication system performing random access for establishing communication between two stations, the system comprising:

at least one remote station estimating a path loss between itself and a base station by utilizing a received downlink signal from the base station, wherein the remote station sets power levels of a ranging signal by adding a negative offset to the power setting at the beginning of a signal transmission and gradually increases power as a function of a number of random access failures and retries; and at least one base station detecting a presence of each ranging signal, the ranging signal time delay, and the ranging signal power level, wherein:

the base station performs hierarchical detection, in frequency domain and in time-domain, when the ranging signal is modulated on subcarriers of a ranging subchannel and the ranging subchannel is composed of blocks of contiguous subcarriers; and the detection process comprises:

applying Fast Fourier Transform (FFT) to a selected window of a received signal;

correlating, in the frequency-domain, the base-station-specific ranging sequences with a received signal:

wherein the correlation is performed segment-wise;

wherein each segment of the correlation is performed on a subcarrier block; and wherein the correlation result identifies a ranging signal; and correlating, in the time-domain, a full sequence of the identified ranging signal with the corresponding base-station-specific ranging sequence, in a sliding-window fashion, to find the ranging signal time-delay and power.

18. The system of claim 17, wherein a sequence of all modulating signals in a ranging subchannel is a ranging sequence and if a ranging sequence is composed of Hadamard sequences, a dot-product of the received signal and the ranging sequence in a particular segment can simultaneously be evaluated using a Fast Hadamard Transform (FHT).

19. The system of claim 17, wherein a given received ranging subchannel, $\{\vec{r}(k)\}_{k=1}^{K}$, is correlated in the frequency-domain with the ranging sequences associated with the base station, segment-wise, where K is the number of blocks in a ranging subchannel, and wherein if the $m^{th}$ sequence is denoted by $\{\vec{b}_m(k)\}_{k=1}^{K}$, the correlation value, $P_m$, is computed by:

$$P_m = \sum_{k=1}^{K} |\langle \vec{r}(k) \cdot \vec{b}_m(k) \rangle|^2,$$

where the dot-product is computed by:

$$\langle \vec{r}(k) \cdot \vec{b}_m(k) \rangle = \sum_{n=1}^{N} x(k, n) \cdot [c_m(k, n)]^*$$

and where N denotes the number of subcarriers in a block, $x(k, n)$ denotes the received version of the $n^{th}$ subcarrier of the $k^{th}$ block in the given ranging subchannel, and $c_m(k, n)$ represents the value of the $n^{th}$ subcarrier of the $k^{th}$ block in the given ranging subchannel for the $m^{th}$ sequence, and wherein a $P_m$ greater than a given threshold indicates that a ranging signal corresponding to the $m^{th}$ sequence has been detected.

20. The system of claim 17, wherein the time-domain correlation of a full sequence of the identified ranging signal is performed, in a sliding-window fashion, to find the time delay of the ranging signal, using:

$$C(\tau) = \left| \sum_{t=0}^{T} s(t + \tau) \cdot z^*(t) \right| \text{ for } \tau = 0, 1, \ldots, D$$

where T denotes the length of the time-domain ranging sequence, D corresponds to a maximum time delay allowed by the system, and $z^*(t)$ represents the time-domain signal of the detected ranging sequence, and wherein the maximum value of $C(\tau)$ for $\tau=0, 1, \ldots, D$ is an estimate of the ranging signal power and the corresponding value of $\tau$ indicates the ranging signal time-delay.

* * * * *

UNITED STATES PATENT AND TRADEMARK OFFICE
CERTIFICATE OF CORRECTION

| | | |
|---|---|---|
| PATENT NO. | : 7,995,967 B2 | |
| APPLICATION NO. | : 10/583158 | |
| DATED | : August 9, 2011 | |
| INVENTOR(S) | : Xiaodong Li et al. | |

It is certified that error appears in the above-identified patent and that said Letters Patent is hereby corrected as shown below:

On the Title page, in field (73), in column 1, line 1, delete "Inc," and insert -- Inc., --, therefor.

In column 9, line 1-2, in claim 17, delete "frequency domain" and insert -- frequency-domain --, therefor.

Signed and Sealed this

Thirteenth Day of December, 2011

David J. Kappos
*Director of the United States Patent and Trademark Office*